United States Patent
Donval et al.

(10) Patent No.: US 9,268,158 B2
(45) Date of Patent: Feb. 23, 2016

(54) RESPONSIVITY ENHANCEMENT OF SOLAR LIGHT COMPOSITIONS AND DEVICES FOR THERMOCHROMIC WINDOWS

(71) Applicant: KiloLambda Technologies Ltd., Tel Aviv, IL (US)

(72) Inventors: Ariela Donval, Rosh Haayin (IL); Noam Gross, Kiryat Ono (IL); Eran Partouche, Petach Tiqva (IL); Doron Nevo, Ra'anana (IL); Moshe Oron, Rehovot (IL)

(73) Assignee: KiloLambda Technologies Ltd., Tel-Aviv (IL)

( * ) Notice: Subject to any disclaimer, the term of this patent is extended or adjusted under 35 U.S.C. 154(b) by 200 days.

(21) Appl. No.: 13/959,150

(22) Filed: Aug. 5, 2013

(65) Prior Publication Data

US 2013/0342888 A1     Dec. 26, 2013

Related U.S. Application Data

(63) Continuation-in-part of application No. 13/771,714, filed on Feb. 20, 2013, now Pat. No. 8,922,868.

(60) Provisional application No. 61/706,208, filed on Sep. 27, 2012, provisional application No. 61/601,715, filed on Feb. 22, 2012.

(30) Foreign Application Priority Data

Feb. 28, 2012    (IL) .......................................... 218364

(51) Int. Cl.
    *G02F 1/01*         (2006.01)
    *B32B 17/10*       (2006.01)
    (Continued)

(52) U.S. Cl.
CPC ........ *G02F 1/0147* (2013.01); *B32B 17/10477* (2013.01); *C09K 9/00* (2013.01); *B82Y 20/00* (2013.01); *B82Y 30/00* (2013.01); *G02F 1/0126* (2013.01)

(58) Field of Classification Search
CPC ........... G02F 1/01; G02F 1/0147; G03C 1/00; G02B 5/22
USPC .................. 359/288, 241, 350, 356; 977/833; 252/586; 283/87, 88
See application file for complete search history.

(56) References Cited

U.S. PATENT DOCUMENTS

| | | |
|---|---|---|
| 3,279,327 A | 10/1966 | French |
| 3,384,324 A | 5/1968 | Drive |

(Continued)

FOREIGN PATENT DOCUMENTS

| | | |
|---|---|---|
| EP | 0608203 B1 | 6/1999 |
| EP | 2 631 707 A1 | 8/2013 |

(Continued)

OTHER PUBLICATIONS

Babulanam, S. et al. "Thermochromic $VO_2$ Films for Energy-Efficient Windows." Solar Energy Materials. vol. 16. 1987. (pp. 347-363).

(Continued)

*Primary Examiner* — Tuyen Tra
(74) *Attorney, Agent, or Firm* — Nixon Peabody LLP

(57) ABSTRACT

An optical window-filter includes a thermochromic material and a light absorbing material that can be bonded chemically. Absorption of light by the light absorbing material generates heat that causes phase transformation of the thermochromic material. A filter for an infrared imaging system has detectors sensitive to radiation in an infrared transmission spectrum. The filter includes a thermochromic material and a light-absorbing material. Absorption of high-power radiation in the infrared transmission spectrum by the light-absorbing material generates heat that causes phase transformation of the thermochromic material to attenuate the high-power radiation while transmitting substantially unaffected low-power radiation in the infrared transmission spectrum.

26 Claims, 9 Drawing Sheets

(51) Int. Cl.
*C09K 9/00* (2006.01)
*B82Y 20/00* (2011.01)
*B82Y 30/00* (2011.01)

(56) References Cited

U.S. PATENT DOCUMENTS

| | | | |
|---|---|---|---|
| 3,512,869 | A | 5/1970 | Pulmat |
| 3,711,176 | A | 1/1973 | Alfrey, Jr. et al. |
| 3,743,964 | A | 7/1973 | Drexhage et al. |
| 3,790,250 | A | 2/1974 | Mitchell et al. |
| 3,953,110 | A | 4/1976 | Charoudi |
| 3,992,628 | A | 11/1976 | Karney |
| 4,099,840 | A | 7/1978 | van der Wal et al. |
| 4,229,066 | A | 10/1980 | Rancourt et al. |
| 4,260,225 | A | 4/1981 | Walles |
| 4,261,331 | A | 4/1981 | Stephens |
| 4,307,942 | A | 12/1981 | Chahroudi |
| 4,401,690 | A | 8/1983 | Greenberg |
| H1182 | H | 5/1993 | Spry |
| 6,049,419 | A | 4/2000 | Wheatley et al. |
| 6,084,702 | A | 7/2000 | Byker et al. |
| 6,172,795 | B1 | 1/2001 | Carlson |
| 6,301,040 | B1 | 10/2001 | Chakrapani et al. |
| 6,522,446 | B2 | 2/2003 | Saxe |
| 6,597,412 | B1 | 7/2003 | Buzak et al. |
| 6,606,185 | B2 | 8/2003 | Saxe |
| 6,674,419 | B2 | 1/2004 | Ilcisin et al. |
| 7,259,925 | B1 | 8/2007 | Ahn |
| 7,278,369 | B2* | 10/2007 | Kelley et al. ............ 116/34 A |
| 7,973,998 | B2 | 7/2011 | Xue |
| 8,044,813 | B1* | 10/2011 | Dembo et al. ............ 340/635 |
| 2005/0082480 | A1 | 4/2005 | Wagner et al. |
| 2007/0068630 | A1* | 3/2007 | Griffin et al. ............ 156/387 |
| 2011/0233404 | A1 | 9/2011 | Sonstroem |
| 2011/0260123 | A1 | 10/2011 | Granqvist et al. |
| 2012/0132930 | A1* | 5/2012 | Young et al. ............ 257/84 |

FOREIGN PATENT DOCUMENTS

| | | |
|---|---|---|
| WO | WO2008/087077 A1 | 7/2008 |
| WO | WO2009/156816 A1 | 12/2009 |
| WO | WO 2012/098511 A1 | 7/2012 |

OTHER PUBLICATIONS

Extended European search report mailed Apr. 22, 2013 which issued in corresponding European patent application No. 13156434.6 (7 pages).

Ginneton, F. et al. "Comparative Study Between Nanocrytalline Powder and Thin Film of Vanadium Dioxide $VO_2$: Electrical and Infrared Properties." Journal of Physics and Chemistry of Solids. vol. 62. Jun. 2000. (pp. 1229-1238).

Jin, P. et al. "Tungsten Doping into Vanadium Dioxide Thermochratic Films by High-Energy Ion Implantation and Thermal Annealing." Thin Solid Films. vol. 324, No. 1998. Oct. 1997. (pp. 151-158).

Kiri, P. et al. "Solid State Thermochromic Materials." Advanced Materials Letters. vol. 1, No. 2. Aug. 2010. (pp. 86-105).

Morin, F. "Oxides Which Show a Metal-to-Insulator Transition at the Neel Temperature." Physical Review Letters. vol. 3, No. 1. Jun. 1959. (pp. 34-36).

Mott, N. "Metal-Insulator Transitions." Taylor & Francis. Second Edition. 1990. (17 pages).

Pierce, J. et al. "Structure of Orthorhombic $V_{0.95}Cr_{0.05}O_2$." Physical Review B. vol. 5, No. 10. May 1972. (pp. 4104-4111).

Suh, J. Y. et al. "Semiconductor to Metal Phase Transition in the Nucleotion and Growth of $VO_2$ Nanoparticles and Thin Films." Journal of Applied Physics. vol. 96, No. 2. Jul. 2004. (pp. 1209-1213).

* cited by examiner

RESPONSIVITY ENHANCEMENT OF SOLAR LIGHT COMPOSITIONS AND DEVICES FOR THERMOCHROMIC WINDOWS

CROSS-REFERENCE TO RELATED APPLICATIONS

This application is a continuation-in-part of and claims priority to U.S. application Ser. No. 13/771,714, filed Feb. 20, 2013, which claims priority to U.S. Provisional Application No. 61/706,208, filed Sep. 27, 2012, Israeli Application No. 218364, filed Feb. 28, 2012 and U.S. Provisional Application No. 61/601,715, filed Feb. 22, 2012, each of which is hereby incorporated by reference herein in its entirety.

FIELD OF THE INVENTION

The present invention relates to sun light or visible light power-limiting devices, and more particularly, to a solar power-limiting passive device and to a method for limiting solar power transmission in windows. Employing absorption changes in a novel thermochromic composition, the responsivity of the composition is enhanced and the reaction time of the composition is shortened when exposed to solar light in ultra-violet (UV), the visible and the near infrared (NIR) regions, i.e., at about 0.3 to 2.5 micrometer (µm) wavelength region of the optical spectrum and when exposed to infrared light in the about 3 to 5 µm and about 8 to 14 µm region of the optical spectrum. These additional response enhancing features enable the use of the thermochromic composition in places where efficient sunlight power limiting is essential and where low infrared emitting or "cold" objects are in the presence, in close vicinity, of high infrared emitting "hot" targets or background.

The present invention further concerns, but is not limited to, the production of windows, lenses, and other optical articles. The present invention further relates to protecting dedicated optical elements against bright emitting sources, like the sun or other hot bodies, that have most of its radiation in the visible and infrared region of the optical spectrum: at wavelengths of between about 0.3 µm to 14 µm.

BACKGROUND OF THE INVENTION

The present invention relates to light power-limiting devices, and more particularly, to a solar power-limiting passive device and to a method for limiting solar power transmission in windows. Employing absorption changes in a novel thermochromic composition, the responsivity of the composition is enhanced and the reaction time of the composition is shortened when exposed to solar light in the visible, near IR region, i.e., at wavelengths of about 0.3 to 2.5 micrometer (µm) of the optical spectrum and to IR imaging systems that employ focal plane arrays in various cameras exposed to infrared light in the 3 to 5 µm and 8 to 14 µm region of the optical spectrum. The additional response enhancing features in this invention enable the use of the thermochromic composition in places where efficient sunlight power limiting is essential and where low infrared emitting or "cold" objects are in the presence, in close vicinity, of high infrared emitting "hot" targets or background.

IR imaging systems employ focal plane arrays in various cameras, having focal plane detectors that are sensitive to light at the 3-5 and 8-12 µm ranges of the optical spectrum. The two ranges cover the two main windows in the IR transmission spectrum of the atmosphere. These systems need to be protected from dazzling and temporary or permanent damage caused by intense radiation sources in the field of view, yet the optical systems should at the same time be completely transparent at these wavelengths for low light power. The intense radiation sources may be of two kinds; first, coherent lasers in the spectral region, continuous or pulsed, and second, non-coherent sources like explosions, field-fire or hot substances in the field of view.

SUMMARY OF THE INVENTION

Since the spectral emission of the hot and cold targets reaching the IR sensor are in the same spectral wavelength region, enhancing the ability to see cold targets can only be achieved by selective control of transparency in which bright light sources are attenuated while weak light sources are not affected. This can be done using a non-linear spatial filter, positioned, e.g., at the focal plane of an imaging system, which attenuates the hot areas in the picture and transmits unaffected the cold parts of the picture, thus expanding its dynamic range. Some aspects of the present invention enable better visibility of low infrared emitting cold targets in the presence, in close vicinity, of high infrared emitting hot targets or background.

Some similar problems for visible light cameras are solved using image processing of the stored picture. Unfortunately, this approach does not work effectively in the IR windows, since saturation effects hinder the operation of the whole focal plane array sensor. Thus, a novel approach is needed for the visible and IR regions combined together in a single window, or when separated into two windows, one for the visible and the other for the IR.

In the phenomenon of thermochromism the optical properties of a material change reversibly as a function of temperature. There are various types of thermochromism. Of special relevance is thermochromism exhibited in the semiconductor-to-metal transition by solid-state materials, such as vanadium and titanium oxides. These can be used in the extreme environmental conditions needed.

A particular case of interest is vanadium dioxide since its transition temperature Tc is close to room temperature. Observations and current understanding of the nature of the semiconductor-to-metal transition exhibited by these materials is known and reported in the literature as seen for example in Pragna Kiri et al., "Solid state thermochromic materials," Adv. Mat. Lett. 2010, 1(2), 86-105, the disclosure of which is incorporated entirely herein by reference. The possibility of fine-tuning the transition temperature by introducing various dopants into the, e.g., vanadium dioxide lattice is a phenomenon which was extensively studied and examined as seen for example in P. Jin et al., "Tungsten doping into vanadium dioxide thermochromic films by high-energy ion implantation and thermal annealing," Thin Solid Films 324_1998. 151-158, the disclosure of which is incorporated entirely herein by reference.

Typically, the thermochromic effect occurs over a range of temperatures and it is observed as a gradual color change, i.e., continuous thermochromism. Discontinuous thermochromism involves a structural phase change at the transition temperature. This phase change can be first or second order in nature, and may be reversible or irreversible, as governed by the thermodynamics of the system as explained for example in N. F. Mott, Metal-Insulator Transitions, second edition (Taylor & Francis, London, 1990).

Transition-metal oxides such as $Ti_2O_3$, $V_2O_3$, $VO_2$, and VO are all semi-conducting at low temperatures and show a transition into a metallic state at the Tc temperature. The electrical properties of these oxides were thoroughly studied using thermo-conductive studies by Morin, F. J. Phys. Rev. Lett. 1959, 3, 34-36. It was discovered that all lower oxides of titanium and vanadium exhibit this behavior except for TiO, which is metallic over the entire temperature range.

Vanadium dioxide is by far the most studied solid state thermochromic material. It shows great promise for applications such as "intelligent" architectural glazing. A single pure crystal of $VO_2$ has a semiconductor-to-metal transition temperature of 341K (68° C.). There is a corresponding structural phase change upon passing Tc, from the low temperature monoclinic crystal structure to the high temperature rutile, tetragonal-type lattice. The phase change alters the optical properties of $VO_2$. In the semiconductor phase it is mostly transparent, in the relevant part of the spectrum, while the transition to metal makes it opaque as explained in S. M. Babulanam et al., "Thermochromic $VO_2$ films for energy efficient windows," Solar Energy Materials 16 (1987) 347-363.

Critical temperature Tc of 68° C. is too high to be effective in many applications. For example, the ideal transition temperature for "intelligent" glazing is in the region of about 18-25° C. Dopants can be incorporated into $VO_2$ to increase or decrease its Tc, in order to make the $VO_2$ more commercially viable as explained in Pierce, J. W.; Goodenough, J. B. Physical Review B 1972, 5(10), 4104. Tungsten reduces Tc of $VO_2$ and there are a number of other dopants that can be incorporated into vanadium oxide to reduce its Tc.

Rare earth nickelates with the general formula $RNiO_3$, where R is a rare earth element, exhibit a metal-insulator transition at temperature of 130K (−140° C.), 200K (−70° C.), 400K (130° C.) and 560K (290° C.) for R=Pr, Nd, Sm and Gd, respectively. The transition temperature decreases with increasing size of the rare earth ion. The nickelates are good candidates for non-linear filters.

Some prior patents include $VO_2$ solid layers as a filter. U.S. Patent Application No. 2011/0233404A1, the disclosure of which is incorporated herein by reference in its entirety, relates to an optical switch-window for an uncooled focal plane array camera for the IR region, using thermochromic-optical-switch-window coated with crystalline thin layer of vanadium oxide. Previously, it was shown in U.S. Pat. No. 7,259,925, the disclosure of which is incorporated herein by reference in its entirety, that a layer of $VO_2$ would generally protect infrared sensors in a Forward Looking Infrared imager (FLIR) against radiation from high power lasers. However, the patent does not disclose how the layer should be incorporated in an uncooled sensor, or how it can be designed to block radiation that is less intense than lasers, such as sunlight, explosion or fire.

The relation between the size of thermochromic particles and the transition properties of individual nano-crystals has been demonstrated and is currently extensively studied. The collective response of $VO_2$ nanoparticles can be related to small size effects, where most of the atoms are in close proximity to the external matrix and not to $VO_2$ lattice, and the properties of opto-electronic devices can be tuned by the size and the arrangements of single domains or single nano-particles as explained in J. Y. Suh et al., "Semiconductor to metal phase transition in the nucleation and growth of $VO_2$ nano-particles and thin films," J. Appl. Phys., Vol. 96, No. 2, 15 Jul. 2004, the disclosure of which is incorporated entirely herein by reference. The optical properties of the oxide are also greatly affected by the transition. The properties of the transition in such systems are partially dictated by the size of the individual domains, e.g., small size $VO_2$ particles are expected to have a wider hysteresis. Indeed, optical hysteresis loops with a width as large as 50° C. have been observed for isolated $VO_2$ nanoparticles. The collective properties of nano-crystals can be tuned by controlling their size and their arrangement. Properties of individual nano-crystals open the possibility to design devices which have unique characteristics.

It was shown that nanotechnology techniques can be used to adjust the threshold value of $VO_2$ networks by controlling the size and the arrangement of the nanocrystals. This is a perfect example to show how the properties at the nano scale can lead to devices with unique characteristics that are not found in the bulk material as explained in F. Guinneton et al., "Comparative study between nanocrystalline powder and thin film of vanadium dioxide $VO_2$: electrical and infrared properties," Journal of Physics and Chemistry of Solids 62 (2001) 1229-1238.

Some aspects of the present invention relate to a novel approach, based on a passive, non-linear filter for the solar radiation spectrum, visible and the IR region, attenuating the solar light when it is hot and transmitting the solar light when it is cold and attenuating the hot areas in the picture and transmitting unaffected the cold parts of the picture. The filter is adapted to block lasers and lower power light sources, like sun light and fire or explosive light burst as well as hot background. Reactions in the filter are improved by employing methods to enhance the light intensity modulation and shorten reaction time of the thermochromic materials.

U.S. Pat. No. 3,790,250 to Mitchell discloses a system, where the conductivity of a light absorbing semiconductor varies with the temperature, and inversely, the light absorption or attenuation level is controlled by the temperature. The disclosed system shows a light absorption of about 80% at 80° C., and the absorption is reduced to about 15% at room temperature. This system is not useful for present application because its temperature dependence changes slowly over a wide range of temperature.

U.S. Pat. No. 4,307,942 to Chahroudi discloses a solar control system where various structure consisting of porous layers absorb the solvents or repel the solvents depending on the temperature and the structures change their optical properties from transparent to solar radiation at low temperatures to a metallic surface or a dielectric mirror to reflect solar radiation of predetermined wavelengths. One of the significant difficulties in implementing such a device, aside from any performance issues, is that there must be a significant reservoir to hold such solvents.

U.S. Pat. No. 4,401,690 to Greenberg discloses a method for making thin films of vanadium oxide with depressed transition temperature of 25° C. to 55° C., which is somewhat close to but is not the transition temperature needed in order for the material to be useful. In addition, here the vanadium oxide is solid and not in the form of nanoparticles.

United States Statutory Invention Registration No. H 0,001,182 to Spry, published May 4, 1993, the disclosure of which is incorporated entirely herein by reference, discloses an optical filter structure using a material that has a ferroelectric phase to a non-ferroelectric phase transition upon changing in temperature and another optically clear material that does not have the phase transition. The resulting optical filter structure can selectively block radiation of a predetermined wavelength, as the refractive index of the phase changing layer changes as temperature change. However, the transition temperature of ferroelectric materials occurs at about 120° C., the induced index of refraction change is about 0.03, and as both layers are optically isotropic in the reflection mode at high temperature, the device will only reflect a nearly normal incident single wavelength light at very high temperatures, and it will require a large number of layers, greater than 5000 to achieve significant reflection across a broadband of near infrared radiations, therefore that will not be applicable for adjusting solar energy control at room temperature range.

The transition temperature of $VO_2$ is reduced by doping the $VO_2$ nanoparticles to increase or decrease its Tc, in order to make the $VO_2$ more commercially viable as explained, e.g., in Pierce, J. W.; Goodenough, J. B. Physical Review B 1972, 5(10), 4104. Tungsten reduces Tc of $VO_2$, and there are a number of other dopants, e.g., Magnesium, that can be incorporated into vanadium oxide to reduce its Tc.

One aspect of the present invention relates to optical power-limiting window, and more particularly, to an optical power-limiting passive device and to a method for limiting optical power transmission in windows. Using absorption changes, in a novel thermo chromic composition having enhanced response, the nonlinearity is enhanced and the reaction time is shortened when exposed to solar light in the visible and near IR (infrared) region, 0.3 to 2.5 micrometer wavelength region of the optical spectrum and when exposed to infrared light in the 3 to 5 and 8 to 14 micrometer wavelength regions of the optical spectrum. These additional response enhancing features enable the use of the thermochromic composition in solar light limiting windows and in places where low infrared emitting or "cold" objects are in the presence, in close vicinity, of high infrared emitting "hot" targets or background.

A further aspect of the present invention relates to an optical window-filter including a thermochromic material and a light absorbing material. An absorption of light by the light absorbing material generates heat that causes phase transformation of the thermochromic material.

Another aspect of the present invention relates to the attachment of the absorbing materials, particularly the dye, serving as an absorbing material, to the thermochromic materials, particularly the thermochromic nanoparticles via either covalent bonding or by van der Waals interactions. Attachment of at least one absorbing dye molecule to a thermochromic nanoparticle enables the generated heat to react more specifically on a certain nanoparticle and hence to increase its efficiency. That is in comparison to unbounded dyes dispersed randomly within the matrix, therefore their efficiency depends on their distance from the nanoparticles. Furthermore, the absorbing dye shell can be used as a surfactant as well. The presence of the dye on top of the nanoparticle's surface can prevent agglomeration either by steric or by electrostatic effects, thus increasing the stability of the colloidal dispersion.

Another aspect of the present invention relates to a filter for an infrared imaging system having detectors sensitive to radiation in an infrared transmission spectrum. The filter includes a thermochromic material and a light-absorbing material. Absorption of high-power radiation e.g., higher than 0.2 Joule/cm$^2$ in the infrared transmission spectrum by the light-absorbing material generates heat that causes phase transformation of the thermochromic material to attenuate the high-power radiation while transmitting substantially unaffected low-power radiation e.g., lower than 0.02 Joule/cm$^2$ in the infrared transmission spectrum.

BRIEF DESCRIPTION OF THE DRAWINGS

The invention will now be described in connection with certain preferred embodiments with reference to the following illustrative figures so that it may be more understood. With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention.

DETAILED DESCRIPTION

Figure 1:
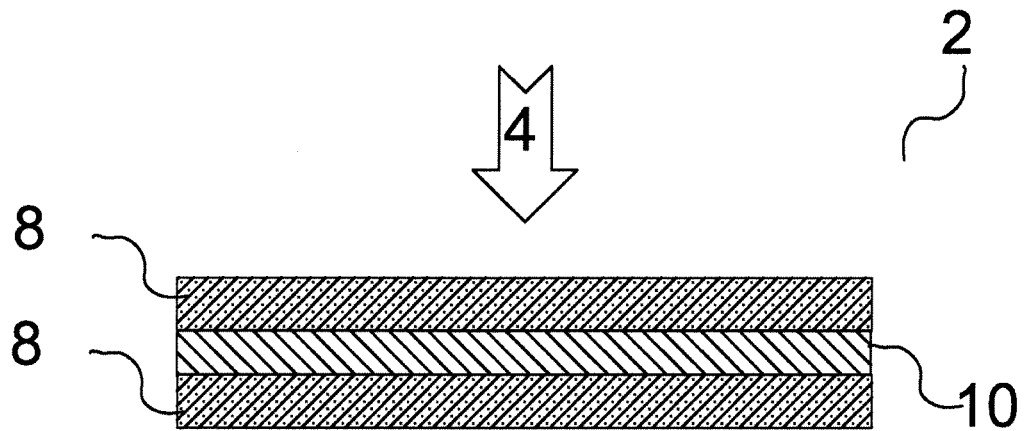
FIG. 1 depicts a cross-sectional view of a thermochromic bulk material window-filter.

Despite the remarkable utility potential of thermochromic materials, their practical uses have been extremely limited. The limitations are largely attributed to the difficulties in providing thermochromic materials that react in low temperatures in the region of 18-30° C. Here we introduce a novel Thermochromic Composition (TCC) containing at least two kinds of materials, embedded in a transparent matrix, where one kind is thermochromic nanoparticle, e.g., $VO_2$ nanoparticles (1 to 100 nanometers in size), and the second kind is light absorbing that can be either covalently bonded to the nanoparticles or dyes not connected chemically, or nanoparticles (1 to 100 nanometers in size) that exhibit strong absorption of the impinging light, e.g., carbon black, ATO (Antimony Tin Oxide), ITO (indium Tin Oxide), FTO (Fluorine doped Tin Oxide) or $LaB_6$ nanoparticles. Examples for light absorbing dyes are commercial dyes made by Epolin Inc, like Epolight 5699 and Epolight 5447, or American Dye Source Inc. made ADS 1065A dye. This combination enhances and accelerates the heating of the neighboring thermochromic particles by the sun-light absorbing nanoparticles and/or dyes, and lead to a phase transformation in the TCC at a lower impinging sun-light intensity than needed for matrices including only thermochromic materials, thus enabling the limiting of the solar light intensity by absorption in the hot thermochromic particles. When the environmental temperature is high, the TCC will start limiting at low solar power, and when the environmental temperature is low, the TCC will start limiting at higher solar power, thus enabling to preserve passively the optimal room temperature when windows of this kind are used in directions exposed to the sun.

The matrix in the TCC can be organic-based, e.g., a polymer film, a polymerizable composition, a transparent adhesive, or inorganic-based, e.g., mineral glass, sol-gel, and any other window materials, and also an inorganic-organic composite. Since the whole thickness of the composition can be less than the light wavelength, even a composition that is opaque in bulk materials is transparent in the sub wavelength thickness.

Specific embodiments utilize various TC nanoparticles and combinations of TC nanoparticles in the TCC, such as rare earth nickelates with the general formula $RNiO_3$, where R=Pr, Nd, Sm or Gd, or any combination thereof, or transition-metal oxides such as $Ti_2O_3$, $V_2O_3$, $VO_2$, and VO, or any combination thereof.

Various absorption enhancing materials can be used in the TCC to enhance light absorption from the impinging external light. Examples include, but are not limited to, light absorbing dyes, carbon nanoparticles, metallic or organic nanoparticles, hollow-shell nanoparticles, rice-like nanoparticles, noncon-centric-nanoshell nanoparticles, crescent-moon-structured nanoparticles, nanoshells composed of layers of metal or carbon.

Addition of a third kind of particles to the TCC matrix, nanoparticles that are thermal conductivity enhancers, can be used to enhance the thermal conductivity of the matrix. The three components TCC effectively achieve two purposes; first, heat that builds up in the optical element during the absorption of light can dissipate more easily to other elements in the system, effectively reducing the thermal degradation of both the organic material and the TCC matrix. Second, most TC materials have a hysteresis behavior with a temperature range of up to tens of degrees between Tc of heating up and Tc of cooling down, thus dissipating the heat evenly throughout the material may help in eliminating "warm islands" within the matrix that can artificially extend the temperature range of the hysteresis.

In one specific embodiment, the thermal conductivity of matrices is achieved by the addition of nanoparticles, nano-rods, nanowires, hollow nanoparticles, core-shell nanoparticles, spiked particles, and nanoparticles with various shapes. These may include nanoparticles of metal, metal oxide, metal nitrides, metal carbides, metal sulfides, and carbon-based nanomaterials, such as nanodiamond, diamond-like carbon (DLC), single-wall carbon nanotubes, double-wall carbon nanotubes, multiwall carbon nanotubes, and their functionalized forms like graphene. The various compositions can be polymerized, cured or fabricated in the form of nanoparticles and/or microparticles. The nanoparticles and/or the microparticles can be further dispersed in a new matrix, appropriate for forming a window.

In one specific embodiment, the light absorbing, the TC and the thermal conductivity-enhancing particles can be placed each in adjacent nano-layers, each containing one or more kinds of particles or dyes.

Specific embodiments utilize TC materials, e.g., $VO_2$ nanoparticles, of various degrees of doping, e.g., with tungsten. Doping is known to reduce to some extent the transmittance modulation, i.e., the difference between transmittance in the hot and cold states, on which the dynamic window or filter is based. Using different degrees of doping within the composition enhances the responsivity without significantly affecting the transmittance modulation or the functionality of the window. The transition commences at low temperatures due to the highly doped $VO_2$. This increases the solar absorbance of the layer, which in turn heats it up even more. The higher temperatures also put the less doped $VO_2$ into transition. A run-away process evolves where eventually all $VO_2$ nanoparticles are in the ON state.

FIG. 1 depicts a cross-sectional view of a thermochromic bulk material window-filter 2. Solar light 4 enters the filter 2 through a transparent plate of light transmitting material 8, e.g., glass slab, and impinges on a layer of thermochromic solid material 10. In case the material 10 is, e.g., $VO_2$, when the impingement spot is cold, less than Tc, the light passes through nearly unaffected in direction 6. When the impingement spot is hot, from Tc and up, the light is strongly affected, most of it, (e.g., more than about 60%) is absorbed in the layer 10. The filter 2 stays opaque until the temperature Tc gets back to cold, and then returns to transparency.

Figure 2:
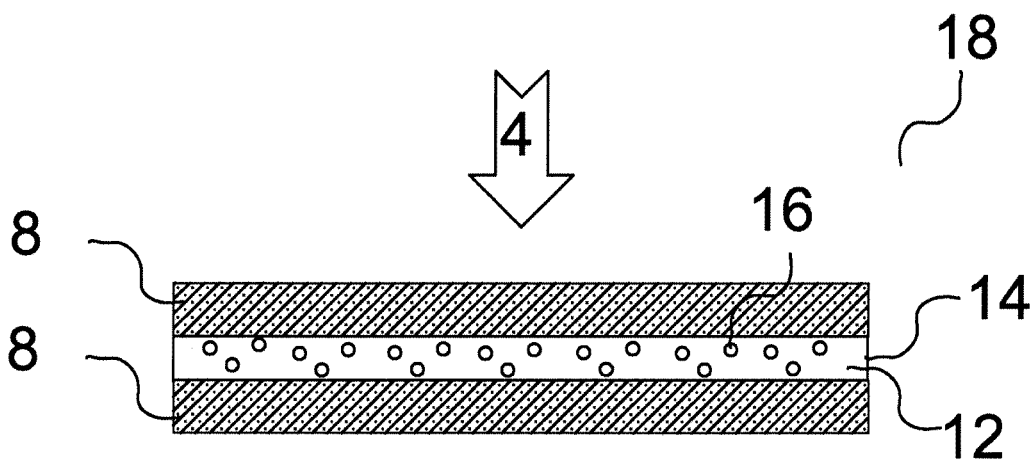
FIG. 2 depicts a cross-sectional view of a thermochromic nanoparticle matrix window-filter.

FIG. 2 depicts a cross-sectional view of a thermochromic nanoparticle matrix window-filter 18. Solar light 4 enters the filter 18 through a transparent plate of light transmitting material 8, e.g., glass slab, and impinges on a layer of TCC 14 containing nanoparticles of TC material 16 in a matrix 12. In case the material 16 is, e.g., $VO_2$, when the impingement spot is cold, less than Tc, the light passes through nearly unaffected in direction 6. When the impingement spot is hot, from Tc and up, the light is strongly affected; most of it is absorbed in the layer 14. The filter 18 stays opaque until the temperature gets back to cold, and then returns to transparency. Since Tc is affected by the size and volumetric arrangement of particles 16, this Tc temperature can be tuned in some narrow temperature range using various sizes, e.g., between about 1 to 100 nm, of nanoparticles and arranging them in the desired geometry. The TC material 16 can be undoped for Tc reduction or doped as described below in connection with FIG. 9.

Figure 3:
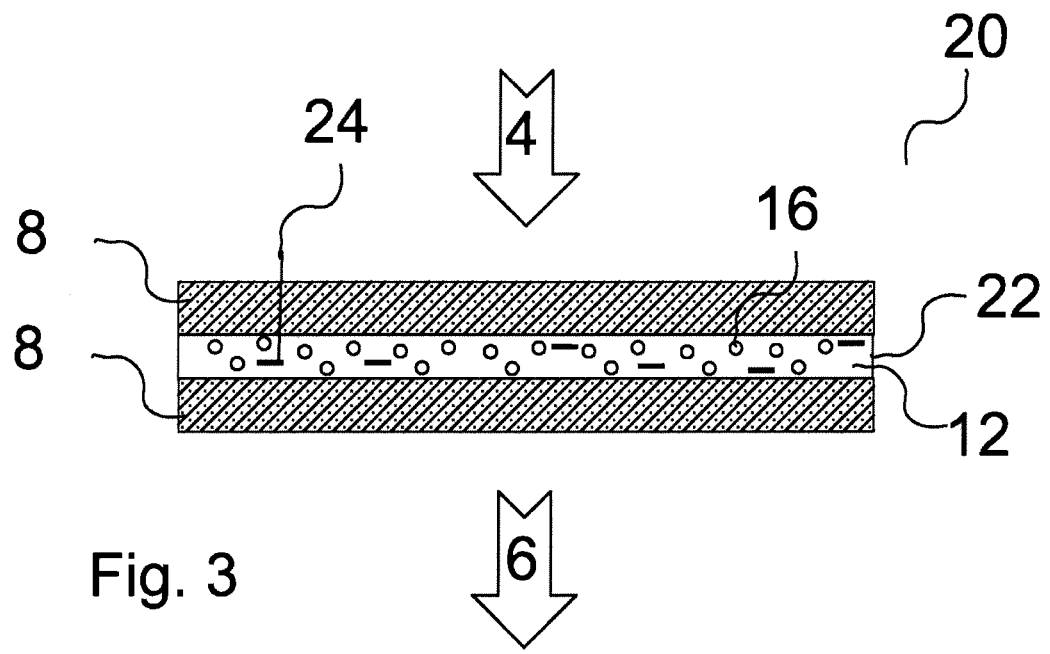
FIG. 3 depicts a cross-sectional view of a thermochromic and light absorbing nanoparticle matrix window-filter.

FIG. 3 depicts a cross-sectional view of a thermochromic and light absorbing nanoparticle matrix window-filter 20. Solar light 4 enters the filter 20 through a transparent plate of light transmitting material 8, e.g., glass slab, and impinges on a layer of TCC solid material 22. The TCC 22 contains two kinds of materials, embedded in a transparent matrix 12, where one kind is thermochromic nanoparticles 16, e.g., $VO_2$ nanoparticles and the second kind 24 is light absorbing dyes or nanoparticles that exhibit strong absorption of the impinging light, e.g., carbon nanoparticles (about 1 to 100 nanometers in size). This combination will result in enhanced heating of the neighboring thermochromic particles 16 by the light absorbed by absorbing material 24. The enhanced absorption, in the transparent case of the TCC will cause phase transformation in the TCC in lower impinging light intensity than needed for matrices including only thermo-chromic materials 16, thus enhancing the ability of the material to limit the amount of sun light transmitted through. In case the material 16 is, e.g., $VO_2$, when the impingement spot is cold, less than Tc, the light passes through nearly unaffected in direction 6. When the impingement spot is hot, from Tc and up, the light is strongly affected and most of it is absorbed in the layer 22. The filter 20 stays opaque until the temperature gets back to cold, and then returns to transparency.

Figure 4:
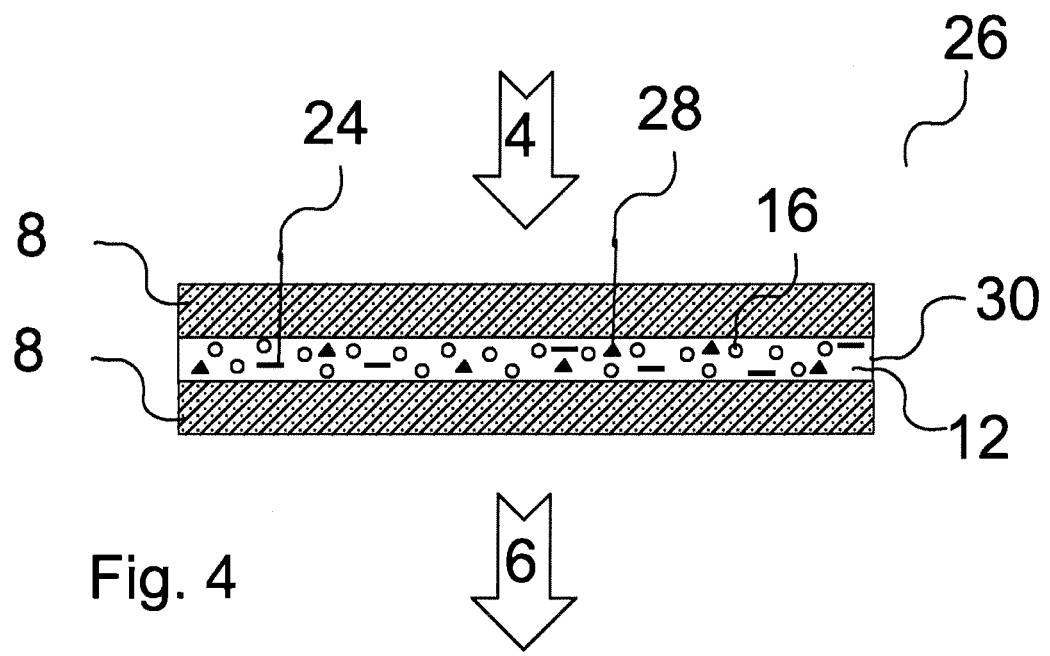
FIG. 4 depicts a cross-sectional view of a thermochromic, thermal conductivity-enhancing and light absorbing nanoparticle matrix window-filter.

FIG. 4 depicts a cross-sectional view of a thermochromic, thermal conductivity-enhancing and light absorbing materials matrix window-filter 26. Solar light 4 enters the filter 26 through a transparent plate of light transmitting material 8, e.g., glass slab, and impinges on a layer of TCC solid material 30. The TCC 30 contains three kinds of materials, embedded in a transparent matrix 12, where one kind is thermochromic nanoparticles 16, e.g., $VO_2$ nanoparticles (1 to 100 nanometers in size) and the second kind 24 is light absorbing dyes or nanoparticles that exhibit strong absorption of the impinging light, e.g., carbon nanoparticles (1 to 100 nanometers in size).

The third kind is nanoparticles that are thermal conductivity enhancers 28 (about 1 to 100 nanometers in size) intended to enhance the thermal conductivity of the matrix. The three components TCC effectively achieve two purposes; one, heat that builds up in the optical element during the absorption of light can dissipate more easily to other elements in the system, effectively reducing the thermal degradation of both the matrix and the TCC matrix. Second, since most TC materials have a hysteresis behavior with a temperature range of up to tens of degrees between Tc of heating up and Tc of cooling down, dissipating the heat evenly throughout the matrix, by using thermal conductivity enhancers will reduce the recovery time to transparency after exposure to strong light. This effect can also be achieved either by attaching the absorbing dye molecules directly to the thermochromic nanoparticles or by attaching the absorbing dye molecules directly to the thermal conductivity-enhancing nanoparticles. This combination will result in enhanced heating of the neighboring thermochromic particles 16 by the light absorbed by absorbing dyes and nanoparticles 24. The enhanced absorption, in the transparent case of the TCC 30 will cause phase transformation in the TCC 30 in lower impinging light intensity than needed for matrices including only thermochromic materials 16, thus enhancing the ability of the material to limit the amount of sun light transmitted through. In case the material 16 is, e.g., $VO_2$, when the impingement spot is cold, less than Tc, the light passes through nearly unaffected in direction 6. When the impingement spot is hot, from Tc and up, the light is strongly affected and most of it is absorbed in the layer 30. The filter 26 stays opaque until the temperature gets back to cold, and then returns to transparency. Particles 28, being thermal conductivity enhancers intended to enhance the thermal conductivity of the matrix, are bringing the TCC 30 back to transparency faster than without them. By tuning the TCC 30 composition between the three kinds of materials 16, 24, 28, an optimal design can be reached.

Figure 5:
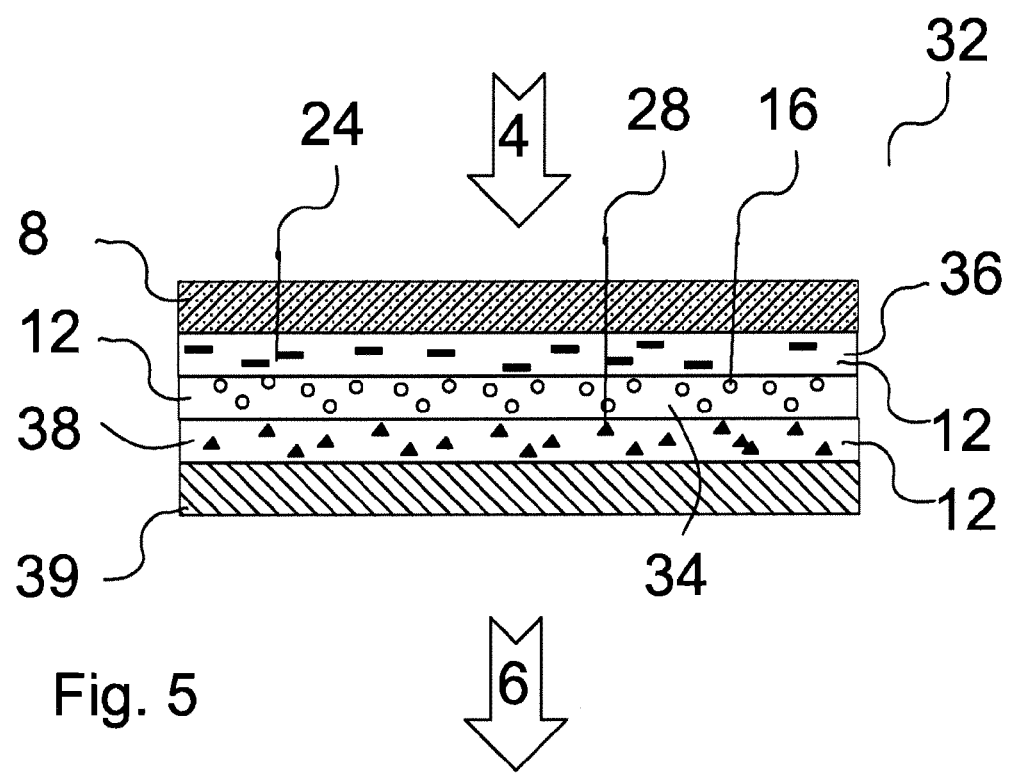
FIG. 5 depicts a cross-sectional view of a thermochromic, thermal conductivity-enhancing and light absorbing nanoparticle matrix window-filter where each kind of particle is in a separate layer.

FIG. 5 depicts a cross-sectional view of a thermochromic, light absorbing and thermal conductivity-enhancing materials matrix window-filter 32 where each kind of particle is located in a separate layer 34, 36 and 38, respectively. The layers are thin, in the order of 100 micrometers, and heat conduction between them is carried out through their common facets. Solar light 4 enters the filter 32 through a transparent plate of light transmitting material 8, e.g., ZnSe or ZnS slab, and impinges on a layer of TCC solid materials 34, 36, 38. The TCC solid materials 34, 36, 38 contain three kinds of materials, each one embedded in its own transparent matrix 12, where one kind, in layer 34, is thermochromic nanoparticles 16, e.g., $VO_2$ nanoparticles (1 to 100 nanometers in size). The second kind in layer 36 is light absorbing dyes or nanoparticles 24 that exhibit strong absorption of the impinging light, e.g., carbon nanoparticles (1 to 100 nanometers in size) and/or light absorbing dyes, the third kind, in layer 38 is nanoparticles that are thermal conductivity enhancers 28 (1 to 100 nanometers in size) intended to enhance the thermal conductivity of the matrix. The three TCC layer composition effectively achieves two purposes; one, heat that builds up in the optical element during the absorption of light can dissipate more easily to other elements in the system, effectively reducing the thermal degradation of both the matrix and the TCC matrix layers. Second, since most TC materials have a hysteresis behavior with a temperature range of up to tens of degrees between Tc of heating up and Tc of cooling down, dissipating the heat evenly throughout the matrix by using thermal conductivity enhancers will reduce the recovery time to transparency after exposure to strong light. This combination will result in enhanced heating of the neighboring thermochromic particles 16 by the light absorbed by layer 36 of absorbing material. The enhanced absorption, in the transparent case of the TCC 32 will cause phase transformation in the TCC 32 in lower impinging light intensity than needed for matrices including only thermochromic materials 16, thus enhancing low light emitting objects in the field of view. In case the material 16 is, e.g., $VO_2$, when the impingement spot is cold, less than Tc, the light passes through nearly unaffected in direction 6. When the impingement spot is hot, from Tc and up, the light is strongly affected since most of it is absorbed by the filter 32, which stays opaque until the temperature reduces, and then returns to transparency. Particles 28, being thermal conductivity enhancers intended to enhance the thermal conductivity of the matrix, are bringing the TCC layer back to transparency faster than without them. By tuning the TCC 34, 36, 38 composition between the three kinds of materials 16, 24, 28 an optimal design can be reached. Additional cooling can be achieved by making the back plate 39 of heat conducting material, e.g., Sapphire or diamond. We note that the order in which layers 34, 36 and 38 are presented in FIG. 5 is only for the sake of example and other permutations (arrangements) of the layers 34, 36, 38 are also considered.

Figure 6:
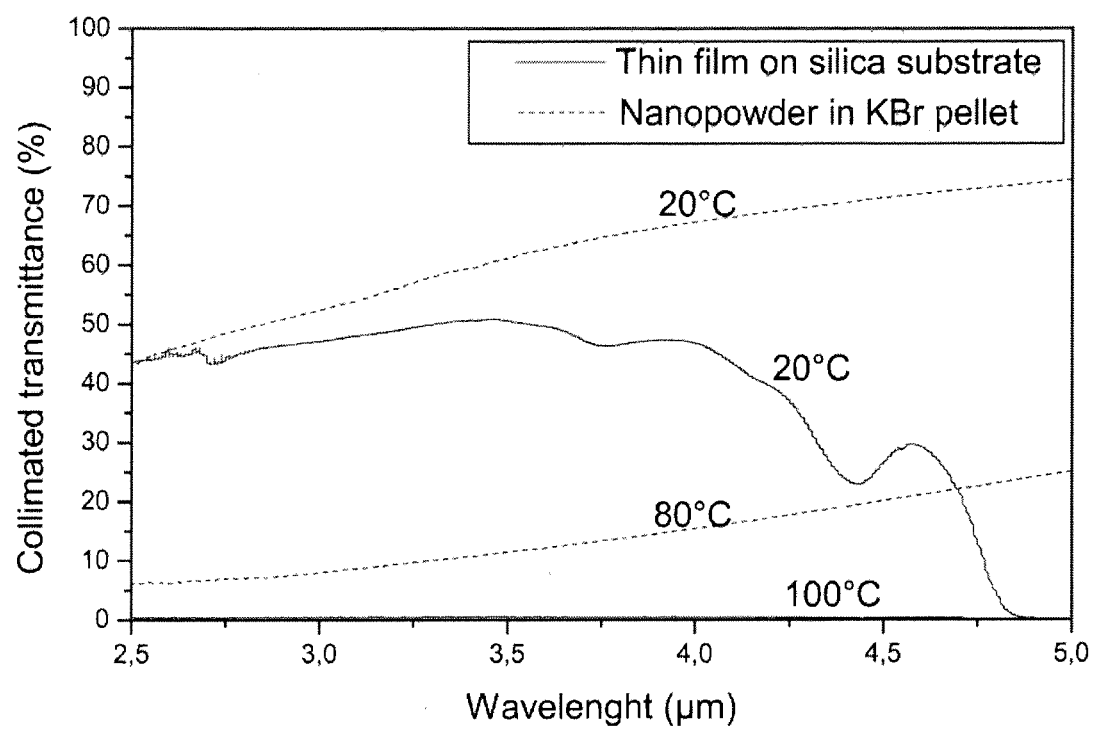
FIG. 6 shows an infrared transmission spectrum of $VO_2$ thin film and nanopowders below and above Tc.
Figure 7:
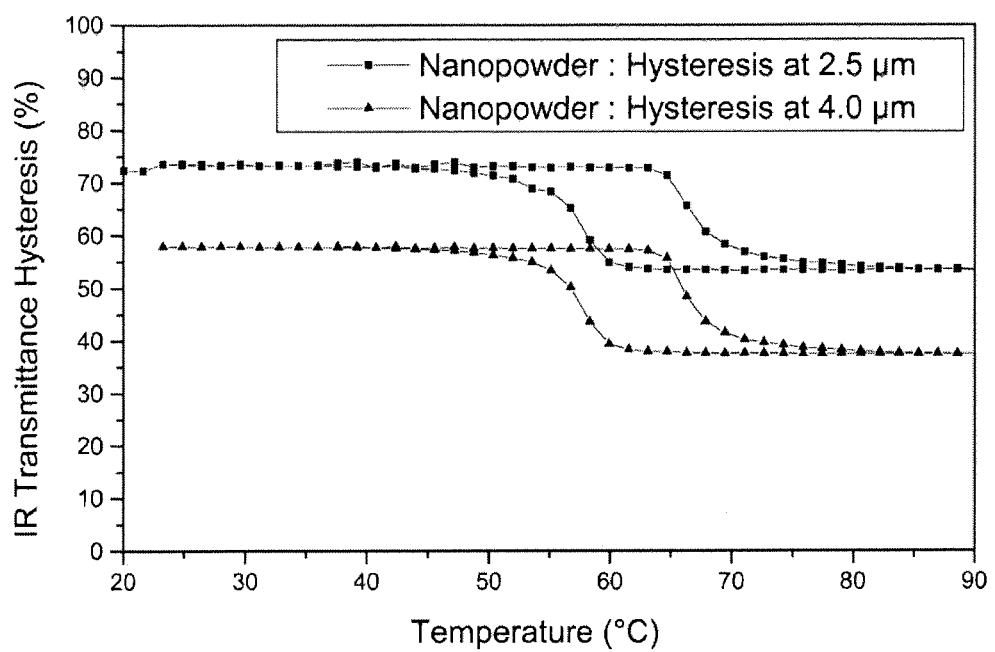
FIG. 7 shows a thermo chromic transition curve having a hysteresis.

FIGS. 6 and 7 show the thermochromic behavior of $VO_2$.

FIG. 6 shows an infrared transmission spectrum of $VO_2$ thin film and nanopowders below and above Tc. The curves show Fourier transform infrared transmittance spectrum for $VO_2$ thin film on amorphous silica in the 2.5 to 5 micrometer infrared transmittance spectrum for $VO_2$ thin film and nanopowders on amorphous silica after computational correction to remove the effects of substrate absorption. The curves depict the difference between the transparent and opaque states. FIG. 6 is cited from F. Guinneton et al., "Comparative study between nanocrystalline powder and thin film of vanadium dioxide $VO_2$: Electrical and infrared properties," Journal of Physics and Chemistry of solids 62, (201) 1229-1238.

FIG. 7 shows a thermochromic transition curve having a hysteresis. FIG. 7 is cited from F. Guinneton et al., "Comparative study between nanocrystalline powder and thin film of vanadium dioxide $VO_2$: electrical and infrared properties," Journal of Physics and Chemistry of Solids 62 (2001) 1229-1238. The curves on the right side show the transition when heating the sample, and on the left side when cooling the sample. There are two wavelengths at which measurements are carried out as depicted in the figure.

Figure 8A:
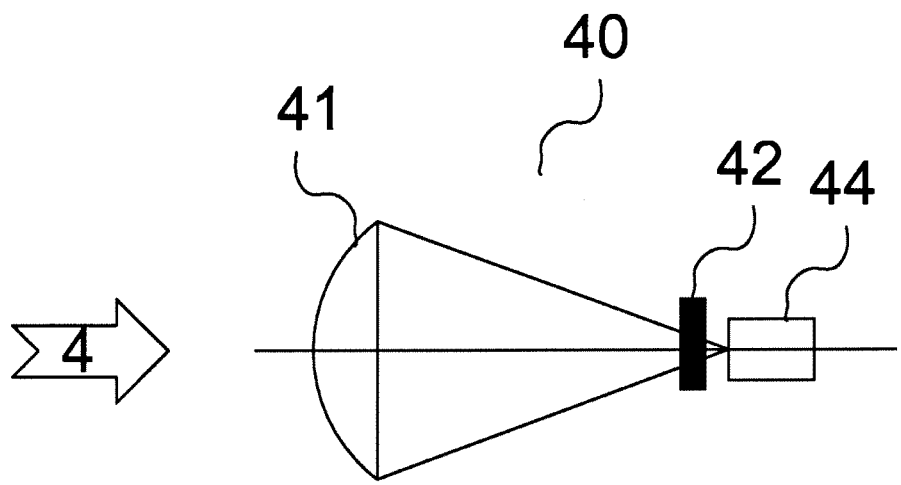
FIG. 8A depicts an example place for filter placement.
Figure 8B:
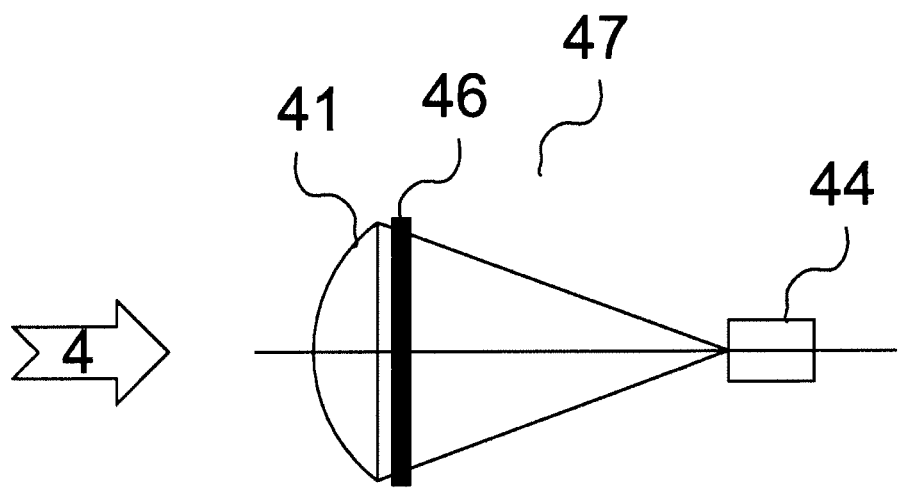
FIG. 8B depicts another example place for filter placement.

FIG. 8 depicts example locations for filter placement. In FIG. 8A, the placement geometry 40 shows the filter 42 near the focal location of lens or telescope 41, in front of the focal plane detector 44. In FIG. 8B, the placement geometry 46 shows the filter 48 at the back side of lens 41. In both cases the filters 42 and 48 shield the focal plane detector 44.

Figure 9:
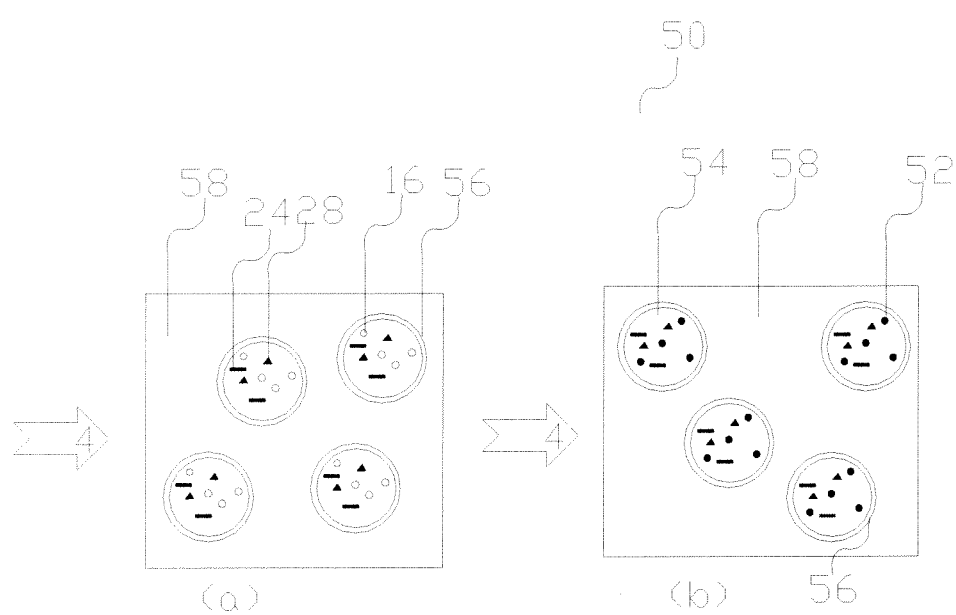
FIG. 9 shows (a) incorporation of thermochromic, thermal conductivity-enhancing and light absorbing nanoparticle encapsulated in nano or micro particles and (b) incorporation of reduced transition temperature thermochromic, thermal conductivity-enhancing and light absorbing nanoparticles encapsulated in nano or micro particles and embedded into a matrix.

FIG. 9 shows (a) an example of incorporation of thermochromic material 16, thermal conductivity enhancers 28 and light absorbing materials 24 by encapsulation in nano or micro particle shell 56 and embedded into a matrix 58 and (b) incorporation of reduced transition temperature thermochromic material 52, thermal conductivity enhancers 28, and light absorbing materials 24 encapsulated in nano or micro particles 56 and embedded into a matrix 58. Solar light 4 enters the filter 50 and meets the composition in (a), thus reacting like the compositions described above, but is easier to manufacture, using nano or micro particles as raw material for matrix casting. In FIG. 9 (b), the nano or micro particle shell 56 contains reduced transition temperature thermochromic material 52 in a single composition or mixture of various levels of transition temperature reduction via, e.g., doping $VO_2$ with various amounts of Tungsten that enables reducing the transition temperature to needed values between 25 and 80° C., depending on composition. In the internal matrix 54 one can plant various compositions of reduced transition temperature thermochromic 52 in a mixture that is optimal for the needed weather conditions. Since the transition temperature is dependent on the doping level of e.g., tungsten into $VO_2$ the mixture can be of particles having different doping level or/and particles having different dopants to reduce the transition temperature.

FIG. 9 shows further examples (*a*) and (*b*) of nano or micro capsules 56, containing nanoparticles, embedded into a matrix 58. Here the size of the nano or micro capsule 56 is about 50 nanometers to 100 micrometers; the shell 56 can be made of, e.g., transparent polymer or glass. The matrix 58 can be made of e.g., transparent polymer or glass.

Figure 10A:
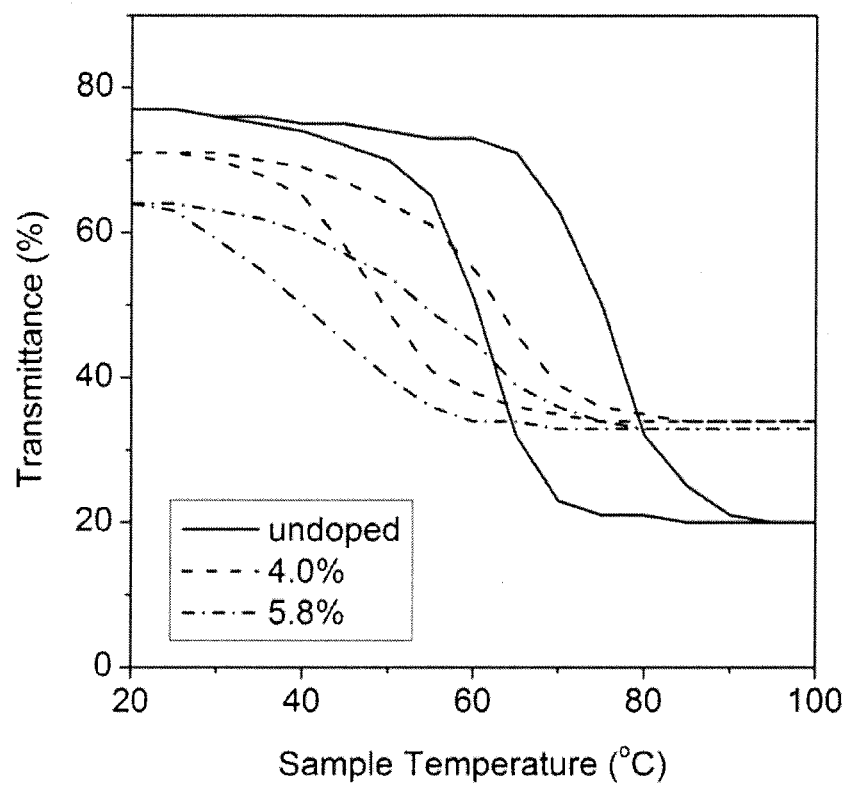
FIG. 10A is a graph of transmittance at 2300 nm wavelength vs. temperature for 50 nm thick $VO_2$ and Mg (magnesium) or W (Tungsten) doped films.
Figure 10B:
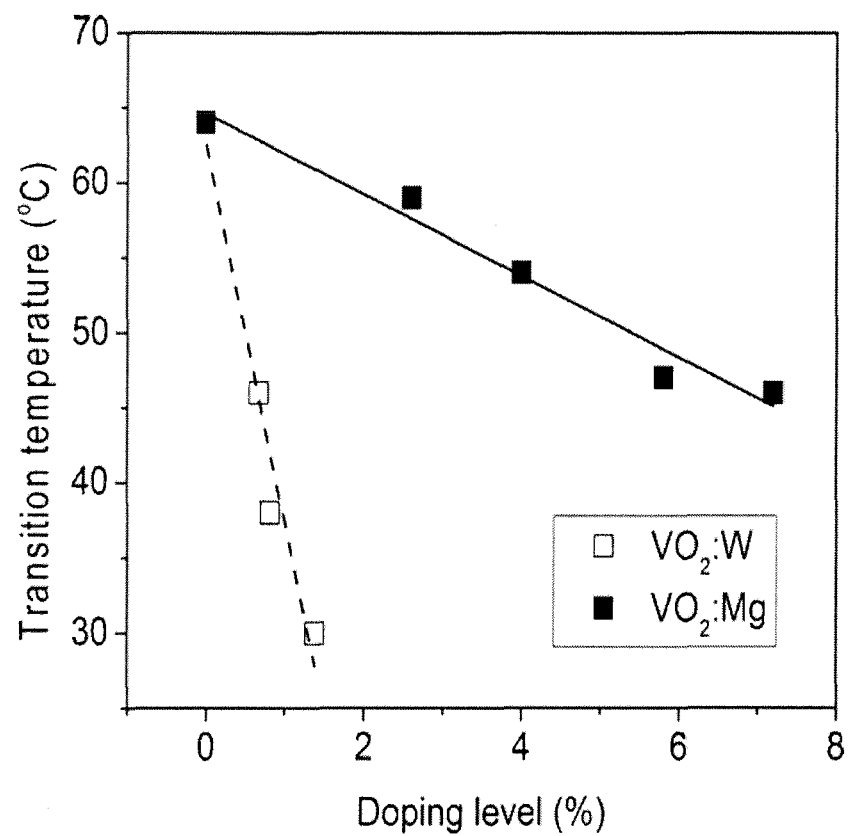
FIG. 10B is a graph of Tc vs. doping level for 50 nm thick $VO_2$ and Mg (magnesium) or W (Tungsten) doped films, showing the effects of Mg or W doping.

FIG. 10A is a graph of transmittance at 2300 nm wavelength vs. temperature, and FIG. 10B is a graph of Tc vs. doping level, for 50 nm thick $VO_2$ and Mg (magnesium) or W (Tungsten) doped films, showing the effects of Mg or W doping. These figures are cited from Mlyuka, Niklasson, and Granqvist, Appl. Phys. Lett. 95, 171909 (2009).

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. An optical window-filter comprising:
a thermochromic material; and
a light absorbing material;
wherein absorption of light by the light absorbing material generates heat that causes a phase transformation of the thermochromic material; and
thermal conductivity enhancers that transfer heat from the light absorbing material to the thermochromic material and transfer heat away from the thermochromic material, said enhancers being encapsulated in nano or micro particles or shells.

2. The optical window-filter of claim 1,
wherein the thermochromic material includes thermochromic nanoparticles, and the light absorbing material includes light absorbing nanoparticles.

3. The optical window-filter of claim 1, further comprising thermal conductivity enhancers that include thermal conductivity-enhancing nanoparticles.

4. The optical window-filter of claim 1, further comprising reduced transition temperature particles that reduce the transition temperature to a desired value between 25 to 80° C.

5. The optical window-filter of claim 1, in which said thermochromic material is encapsulated in nano or micro particles or shells.

6. The optical window-filter of claim 1, in which said light absorbing material is encapsulated in nano or micro particles or shells embedded in a glass or polymer matrix.

7. The optical window-filter of claim 1, in which the light absorbing material is attached to the thermochromic materials, via either covalent bonding or by van der Waals interactions.

8. The optical filter of claim 1, further comprising at least one plate of transparent material adjacent the thermochromic material and the light absorbing material.

9. The optical filter of claim 1 further comprising;
two plates of light transmitting material,
wherein the thermochromic material and the light absorbing material are located between the two plates of light transmitting material.

10. The optical filter of claims 9 further comprising;
two plates of infrared transmitting material;
wherein the thermochromic material, the light absorbing material, and the thermal conductivity enhancers are located between the two plates of infrared transmitting material.

11. The optical filter of claim 1, wherein the thermochromic material forms a first layer, and the light absorbing material forms a second layer, the first layer being adjacent to and in contact with the second layer.

12. The optical filter of claim 1, wherein the thermochromic material forms a first layer, the light absorbing material forms a second layer, and the thermal conductivity enhancers form a third layer.

13. The optical filter of claim 1, wherein if a temperature of a location where the light impinging on the layer including the thermochromic material is less than the transition temperature of the thermochromic material, the light passes through the filter without affecting the transparency of the filter.

14. The optical filter of claim 1, wherein if a temperature of a location where the light impinging on the layer including the thermochromic material is equal to or higher than the transition temperature of the thermochromic material, a majority of the light is absorbed in the layer including the thermochromic material and the filter turns opaque.

15. The filter of claim 14, wherein the filter remains opaque until the temperature of a location where the light impinging on the layer including the thermochromic material falls to a temperature below the transition temperature of the thermochromic material.

16. The optical filter of claim 1, wherein if a temperature of a location where the light impinging on the layer including the thermochromic material is equal to or higher than the transition temperature of the thermochromic material, a majority of the light is absorbed in the layer including the thermochromic material and the filter turns opaque and remains opaque until the temperature is reduced to below the transition temperature of the thermochromic material.

17. The optical filter of claim 1, wherein said thermochromic material, said light absorbing material, and said thermal conductivity enhancers being encapsulated in nano or micro particle shells, said nano or micro particle shells being embedded in a transparent matrix.

18. The optical filter of claim 17, wherein the nano or micro particles or shells have a size of between 50 nm and 100 μum.

19. An optical window-filter comprising:
a thermochromic material;
a light absorbing material;
wherein absorption of light by the light absorbing material generates heat that causes a phase transformation of the thermochromic material;
thermal conductivity enhancers that transfer heat from the light absorbing material to the thermochromic material and transfer heat away from the thermochromic material, and
a first plate of light transmitting material and a second plate including heat conducting material,
wherein the thermochromic material and the light absorbing material are positioned between the first plate and the second plate, wherein the light impinges at the first plate.

20. The optical filter of claim 19, wherein the heat conducting material is at least one of Sapphire and diamond.

21. The optical filter of claim 19, wherein each of the thermochromic material, the light absorbing material and the thermal conductivity enhancer is positioned in a separate layer.

22. A filter for an infrared imaging system having detectors sensitive to radiation in an infrared transmission spectrum, said filter comprising:
a thermochromic material and a light-absorbing material wherein an absorption of radiation higher than 0.2 Joule/$cm^2$ in said infrared transmission spectrum by said light-absorbing material generates heat that causes a phase transformation of said thermochromic material to attenuate said high-power radiation while transmitting substantially unaffected radiation lower than 0.02 Joule/$cm^2$ in said infrared transmission spectrum.

23. The filter of claim 22 in which said high-power radiation occurs in only portions of the image.

24. An optical window-filter comprising:
a thermochromic material;
a light absorbing material;
wherein absorption of light by the light absorbing material generates heat that causes a phase transformation of the thermochromic material,
wherein the thermochromic material includes thermochromic nanoparticles, and the light absorbing material includes light absorbing nanoparticles; and
thermal conductivity enhancers that include thermal conductivity enhancing nanoparticles that transfer heat from said light absorbing material to said thermochromic material and transfer heat away from said thermochromic material;
wherein at least one of said thermochromic material, said light-absorbing material and said thermal conductivity enhancers is encapsulated in nano or micro particles or shells.

25. The optical window-filter of claim 24 in which all of said thermochromic material, said light-absorbing material and said thermal conductivity enhancers are encapsulated in nano or micro particles or shells.

26. The optical window-filter of claim 24 which includes first and second plates, and in which both of said thermochromic material and said light-absorbing material are encapsulated in nano or micro particles or shells positioned between the first plate and the second plate, wherein the light impinges at the first plate.

* * * * *